United States Patent

[11] 3,536,175

[72] Inventors Tsuneo Kawabe and
Uichiro Kobashi, Kariya-shi, Japan
[21] Appl. No. 739,532
[22] Filed June 24, 1968
[45] Patented Oct. 27, 1970
[73] Assignee Aisin Seiki Company Limited
Kariyashi, Aichi-ken, Japan
a corporation of Japan
[32] Priority June 24, 1967, July 7, 1967
[33] Japan
[31] 24/40,698 and 24/43,814

[54] VISCOUS SHEAR CLUTCHES WITH FLOATING ROTORS
6 Claims, 10 Drawing Figs.
[52] U.S. Cl................................................. 192/58, 188/90
[51] Int. Cl.................................................. F16d 35/00

[50] Field of Search........................................... 188/90A5; 192/58, 58(A)1, 58(A)2, 58(A)3, 60(CUR)

[56] References Cited
UNITED STATES PATENTS
| | | | |
|---|---|---|---|
| 973,893 | 10/1910 | Schechter et al. | 192/58(A3)UX |
| 2,742,981 | 4/1956 | Waldron | 192/58(A1)UX |
| 2,879,755 | 3/1959 | Weir | 192/58(A2)UX |
| 3,263,783 | 8/1966 | Sutaruk | 192/58(A1)UX |
| 3,430,743 | 4/1969 | Fujita et al. | 192/58(A2)UX |

Primary Examiner—Benjamin W. Wyche III
Attorney—Sughrue, Rothwell, Mion, Zinn and Macpeak ABSTRACT: A fluid coupling for automotive use, comprising a first rotor and a second rotor, is provided with an idler rotor hydraulically coupled with said both rotors. The axial width of the first rotor is considerably reduced relative to that of the idler rotor.

Patented Oct. 27, 1970

3,536,175

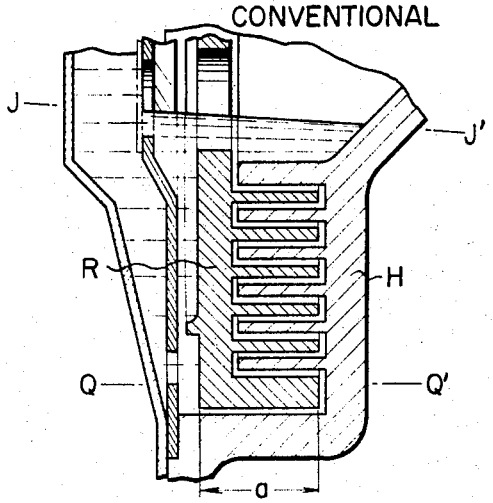
FIG. 3B
CONVENTIONAL
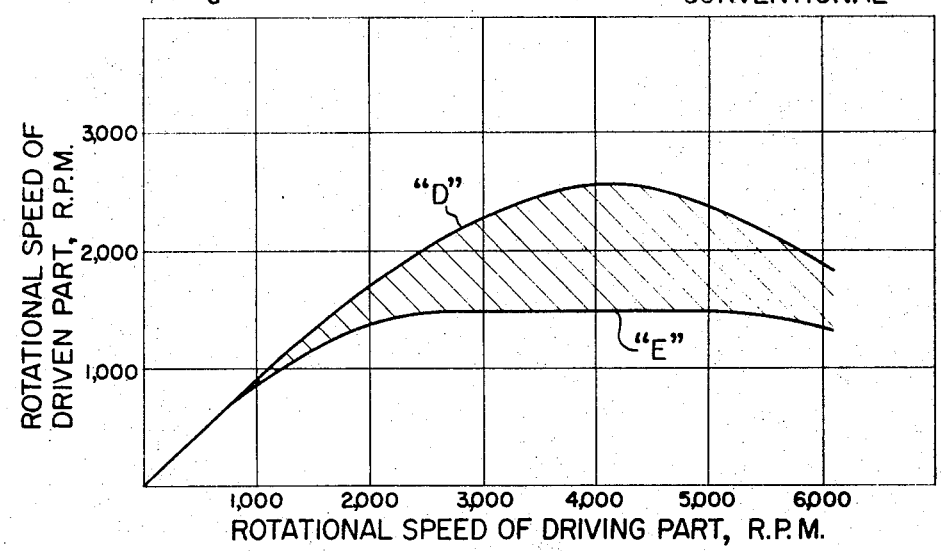
FIG. 5
CONVENTIONAL

VISCOUS SHEAR CLUTCHES WITH FLOATING ROTORS

This invention relates to improvements in and relating to viscous fluid couplings.

In a viscous fluid coupling which is inserted between a prime mover, preferably an automotive internal combustion engine and a driven auxiliary machine, preferably a cooling fan, cooling water pump or the like, it is a required optimum performance of the fluid coupling that the rotational speed of the auxiliary machine varies with variation of the engine speed within a specified range of the latter, and that the speed increase ratio of the auxiliary machine relative to the engine speed reduces with higher engine speed than a specified threshold value of the latter, or at least should be kept substantially constant over a higher engine speed range.

As is commonly known to those skilled in the art, the torque transmission is carried into force in the case of the viscous fluid coupling in such a way that the necessary coupling function between the driving and the driven part of the coupling is relied upon the viscous resistance or viscous shearing force generated in a viscous fluid such as silicon oil or the like contained in small gap spaces provided between a rotating rotor and a stationary casing composing the fluid coupling, when these constituting parts are kept in relative rotation. Therefore, in the course of operation of the fluid coupling, there appears always a fluid slip between the driving and the driven part, depending upon the viscous resistance owned by the coupling fluid. Therefore, with increased rotational speed of the rotor component of the fluid coupling, the fluid contained in the aforementioned gap between the both components will represent a certain degree of flow, resulting in the corresponding increase in the slip speed and thus in the relative fluid flow speed. The viscous resistance (or viscous shearing force) appearing in this case may be expressed by the following formula:

$$\tau = \mu \frac{du}{dy} \quad (1)$$

where, $\mu$ is a viscous coefficient;

$du/dy$ means velocity gradient (or shearing ratio). With still further and heavily increased rotational speed of the rotor, accompanying thus the correspondingly increased slip speed, the temperature rise on account of the shearing resistance will become tremendous and the viscosity coefficient of the coupling fluid will be correspondingly reduced. Therefore, the rise of viscous resistance $\tau$ will be gradually decreased with increase of the rotor speed. Beyond a certain critical value of rotor speed, the rise in the viscous resistance $\tau$ will become substantially nil. With still further increase of the rotor speed, the behavior of viscous resistance will shift to a completely different phase. More specifically, the flowing conditions of the viscous fluid are those of the laminar flow so-called within a certain lower rotor speed range, but beyond a certain critical limit of the rotor speed, the conditions will shift to those of turbulent flow. This phenomenon will appear at first in the outer region of the viscous fluid, because in this region the shearing ratio is the largest relative to the inner region of the fluid. With increase of the rotor speed, this change will gradually cover the more inner region towards the innermost zone of the fluid. Under turbulent flow conditions, the viscous resistance will be:

$$\tau = \mu \frac{du}{dy} - \delta \cdot \bar{u}_1 \cdot \bar{v}_1 \quad (2)$$

where, $\rho$ is the density of the fluid;

$\bar{u}_1$ is the velocity component of the fluid in the X-direction (corresponding to the peripheral direction of the rotor revolution);

$\bar{v}_1$ is the velocity component of the fluid in the Y-direction (corresponding to the radial direction of the rotor).

From the above formula (2), it will be seen that the viscous resistance will be decreased with increase of the rotational speed of the rotor, thereby the rotational speed of the driven part being correspondingly reduced. It will be further observed that the increasing rate of rotational speed of the driven part is negative. Under these conditions, the temperature of the coupling fluid within the fluid coupling is very high, for instance, 150°C.—°C. If the rotor continues to rotate for a considerably long time period such as 2—3 hours, the molecules of the fluid will be subjected to a high temperature deterioration or a "gelation" so-called by those skilled in the art, thereby losing its viscous fluid characteristics and becoming as if it be a macromolecule as a whole, representing the behavior of a gelatinized mass, which leads to loss of its viscous coupling performance within a short time period such as several minutes.

A main object of the present invention is therefore to provide a viscous fluid coupling, capable of substantially obviating the aforementioned "gelation" of the viscous working fluid in the coupling within practically usable speed range of the coupling rotor.

A further object of the invention is to provide a viscous fluid coupling of the above kind, capable of reducing considerably the fluid slip velocity as encountered with the conventional comparative coupling to a possible minimum.

A still another object is to provide a coupling of the above nature, capable of preventing substantially the tendency of the rate of speed increase of the driven part of the coupling from becoming negative.

A further object is to provide a coupling of the above kind, capable of allowing it to operate as desired at a higher operating speed range of the coupling without hindrance for a long extended period of time.

These and further objects, features and advantages of the present invention will become more apparent, when read the following detailed description of the invention by reference to the accompanying drawings which constitute a part of the present specification and show substantially two preferred embodiments of the invention. It should be however stressed expressly that the drawings are only for illustrating purpose and should not be construed to be any definition of the invention.

Figure 2:
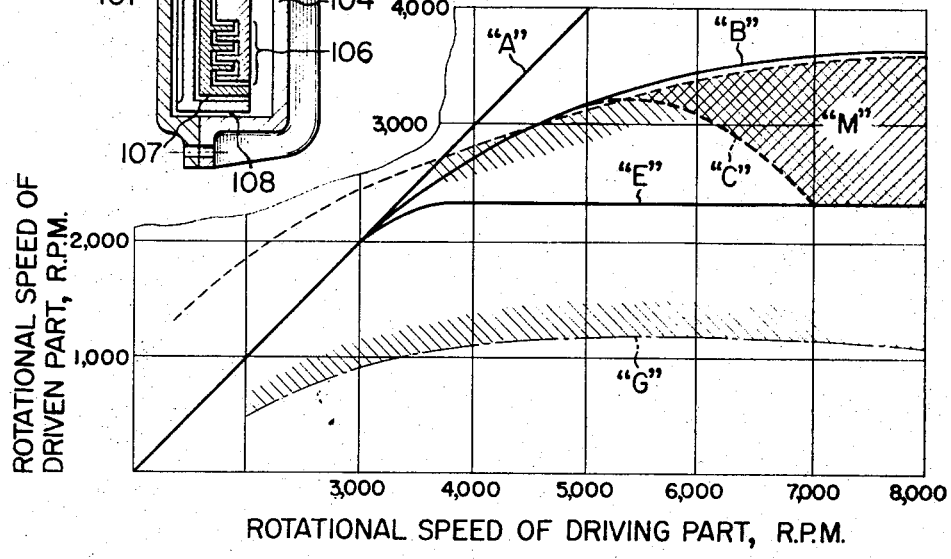

FIG. 2 is a comparative and illustrative diagram of the number of revolutions of the driven part of the fluid coupling plotted against the rotational speed of the driving part of the coupling, wherein curve A illustrates the direct-coupled condition; curve C represents the coupling performance of a conventional comparative machine; curve B shows a similar performance obtained with an improved machine as constructed in accordance with the principles of the invention; and the shaded area represents an ideal coupling performance as desired by the present invention.

Figure 1:
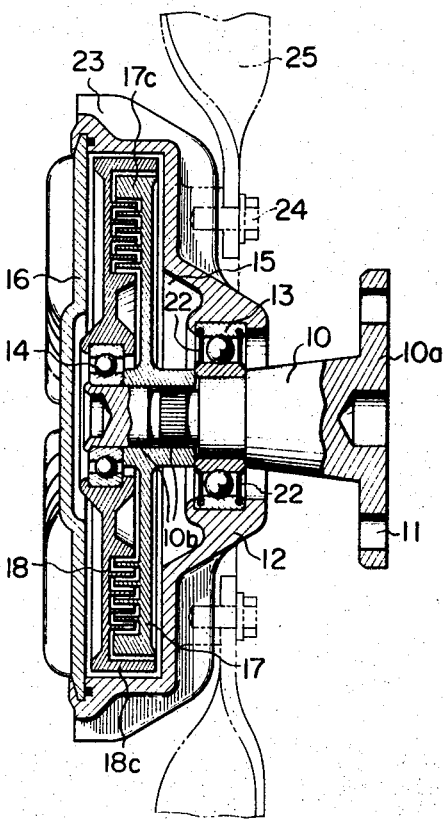
FIG. 1 is a longitudinal section of essential parts of the first embodiment of the invention.
Figure 3A:
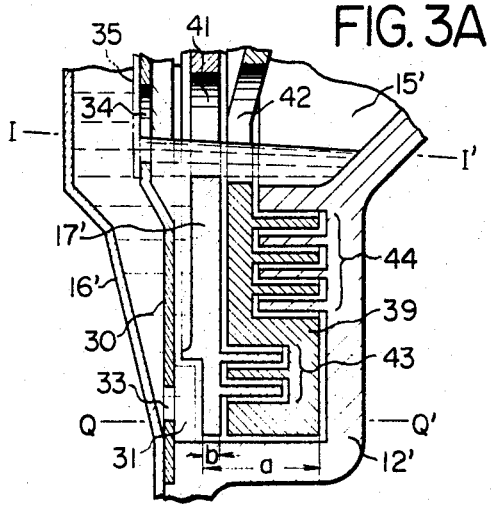
Figure 3:
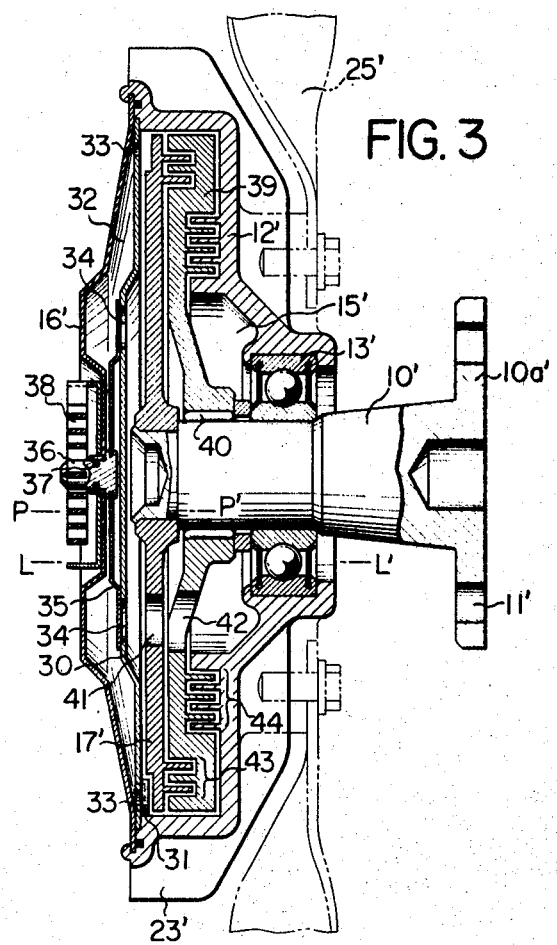

FIG. 3 is a similar view to FIG. 1, yet showing a second embodiment of the invention.

FIG. 3A is an enlarged view of a part of the fluid coupling shown in FIG. 3, wherein the driving and driven parts are fluidically coupled together.

FIG. 3B is a similar view to FIG. 3A, showing a comparative conventional arrangement.

Figure 4:
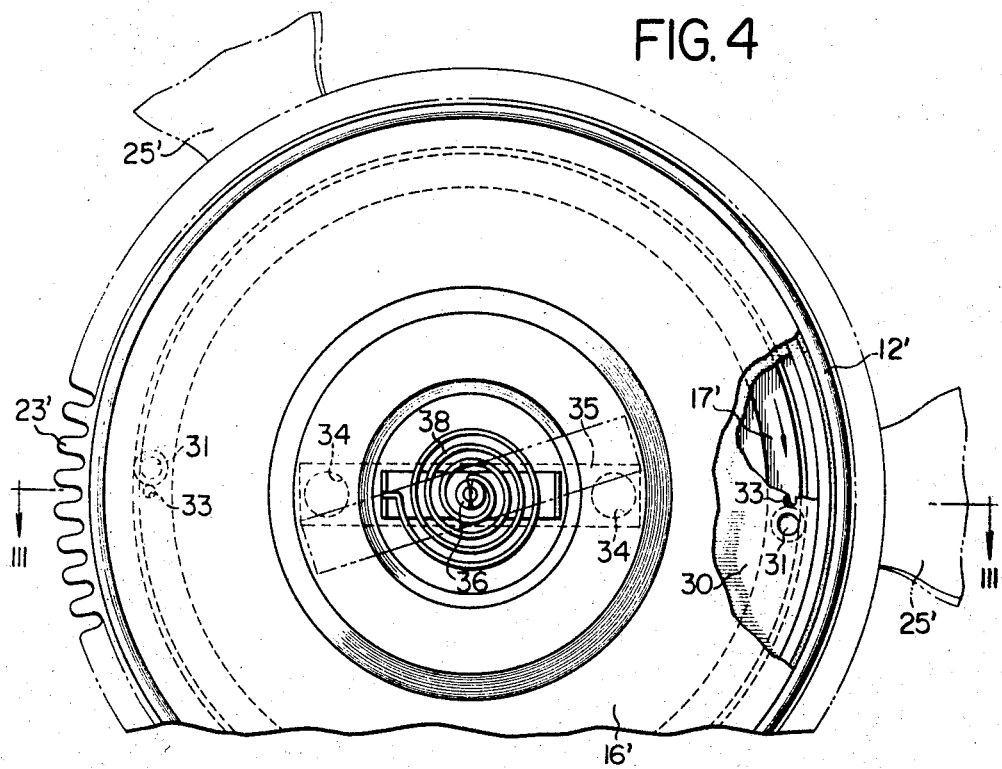

FIG. 4 is a front view of the second embodiment shown in FIG. 3, wherein however several parts are broken away for the illustrating inner operating parts.

FIG. 5 is a characteristic curve of a comparative conventional fluid coupling, wherein curve D represents its coupled conditions, while curve E illustrates its interrupted conditions.

Figure 6:
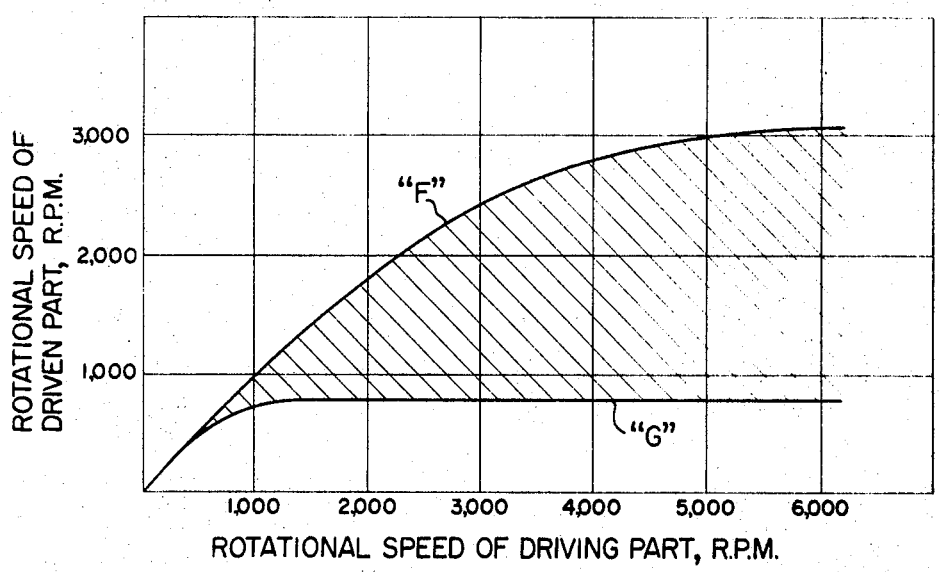

FIG. 6 is a performance curve of the second embodiment of the invention shown in FIGS. 3 and 4, wherein curves F and G corresponds respectively to those denoted D and E in FIG. 5.

Figure 7:
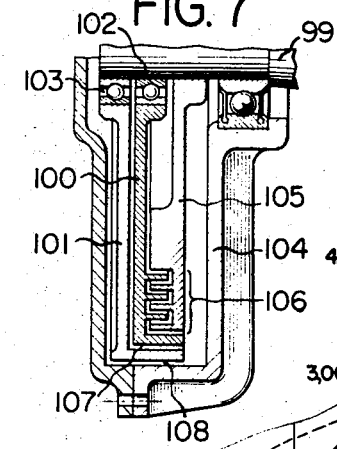

FIG. 7 is a fragmentary sectional view of a modification from the embodiment shown in FIG. 1.

Referring now to the accompanying drawings, especially FIGS. 1 and 2 thereof numeral 10 represents a drive shaft which is formed at its right-hand extremity, in FIG. 1, with a coupling flange 10a having a plurality of bolt holes 11 to be coupled with a cooling water pump shaft, now shown, which is driven through a belt or the like transmission means, not shown, from a prime mover, such as an automotive internal combustion engine, again not shown. Therefore, the flange 11a is the drive or engine side of the fluid coupling.

The drive shaft 10 is supported in the manner of a kind of cantilever, thus no stationary members being provided in the present arrangement for support of all the rotatable members to be described.

A rotatable casing 12 is mounted through antifriction bearing 13 on the drive shaft 10 and establishes therearound a fluid chamber 15 which is closed sealingly at its one side extremity by means of a closure cover 16 attached sealingly and fixedly to the casing by press-fitting or the like conventional procedure.

A first rotor 17 is fixedly mounted on a reduced part 10b of the drive shaft 10 for rotation therewith which part is ranged substantially between bearings 13 and 14, the latter bearing being mounted on the outer extremity of the drive shaft 10 housed within the fluid chamber 15. This first rotor 17 is formed with a plurality of concentric ring projections 17a each neighboring pair of defining a groove 17b.

Figure 1A:
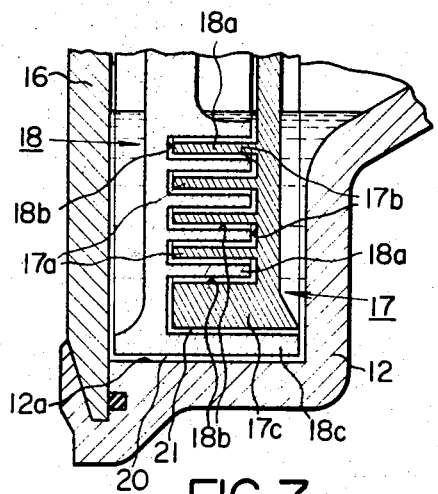
FIG. 1A is an enlarged fragmental representation of the viscous fluid coupling shown in FIG. 1.

A second rotor 18 is rotatably mounted on the drive shaft 10 by said end bearing 14, said second rotor being formed with a plurality of concentric projections 18a each neighboring pair of which define a groove 18b therebetween. As seen in FIGS. 1 and 1A, especially in the latter, the projections 17a on the first rotor 17 project into the respective grooves 18b and alternate with said projections 18a on the second rotor 18 with small gaps. Thus, the projections 18a project into the respective grooves 17b in the similar way. Concentric small gaps formed between the both rotors 17 and 18 in the above-mentioned way are shown at 19.

The second rotor 18 is provided an outer cylindrical flange 18c, and a small cylindrical gap 20 is formed between the inside wall surface 12a and the outer wall surface of said cylindrical flange 18c. A similar cylindrical gap 21 is formed between the outer circular at 17c of first rotor 17 and that denoted 18c of the second rotor 18. Ring-shaped sealing member 22 is provided at the inner side of the bearing 13, so as to seal the fluid chamber 15 at this extremity thereof, said chamber being effectively filled with a viscous fluid such as silicon oil which naturally fills the aforementioned small gaps 19, 20 and 21 for performing the fluid coupling operation, as will be later more fully described.

A plurality of radial fins 23 is rigidly attached on to the outside surface of the rotatable casing 12 to which is bolted as at 24 a plurality of engine cooling fans 25 only partially shown. In this case, the combination of the fan blades 25 with the casing 12 constitutes a machine to be driven from the engine side.

In operation, torque is transmitted from the engine to the drive shaft 10, and thus to the first rotor 17. Therefore, the concentric circular projections 17a as well as the cylindrical flange 17c rotate at a high speed such as 6000 r.p.m. through the viscous fluid contained in the fluid chamber 15, thus acting as fluid shearing members. Torque is thereby transmitted through the viscous fluid, especially that part thereof which exists in the small gaps 19 and 21, to the concentric projections 18a, and thus to the second or intermediate rotor 18, so as to rotate it in the same direction, yet with a certain slip. By the rotation of the second rotor, torque is transmitted in the similar way, through the intermediary of the viscous fluid, especially that part thereof which exists in the small gap 20 to the rotatable casing 12 carrying the fan blades 25, thereby the casing being also rotated in the same direction, yet with a certain slip.

In the following, the aforementioned double coupling operation will be mathematically analyzed, wherein symbols attached with suffix "1" concern with a conventional coupling, while those attached with suffix "2" relate to the present invention, and all the rotational speeds concerned and denoted "$\omega$" are expressed in units of rad./sec.

Now assuming the rotational speed differential between the rotatable casing and the rotor (being sole in its number in the conventional comparative case) be $\omega_1$; similar differential between the first and the second rotor be $\omega_2$; and that between the second rotor and the rotatable casing be $\omega_2'$, it can be concluded that such a relation as:

$$\omega_1 = \omega_2 + \omega_2'$$

must exist, if the conventional coupling provided with no intermediate rotor has a same fundamental operative performance with that of the above described inventive coupling.

If the torque M transmitted from the driving side to the driven side within the fluid coupling is same as the overall transmitted torque in two stages through the intermediary of the intermediate rotor, then we have:

$$M = K_1 \mu_1 \omega_1 = K_2 \mu_2 \omega_2 + K_2' \mu_2 \omega_2'$$

where, K is a form factor which depends upon
the gap width, the area of sheared part of the coupling fluid (torque transmission area) and the diameter measured thereat which may be replaced by the corresponding outside diameter;
$\mu$ is a viscous coefficient of the fluid;

$$\frac{1}{K_1 \mu_1} = \frac{1}{K_2 \mu_2} + \frac{1}{K_2' \mu_2}$$

In order to minimize both values: $\omega_2$ and $\omega_2'$ to a respective minimum, $$\omega_2 = \omega_2' \left( = \frac{1}{2} \omega_1 \right)$$

Therefore, $K_2 = K'_2$, and $$\frac{1}{K_1 \mu_1} = \frac{2}{K_2 \mu_2}$$

In the coupling arrangement, wherein the intermediate rotor is employed as in the above embodiment, the shearing ratio is less than that in the conventional case without use of the intermediate rotor, and the fluid temperature is thus lower than that encountered with the conventional technique.

$$\mu_2 > \mu_1$$

Thus, $K_1 > \frac{1}{2} K_2$

Since the form factor is in proportion with the quadruple factor of the outside diameter of the torque transmitting surface, we will obtain:

$$D_1 > \frac{1}{4\sqrt{2}} D_2$$

$$\approx \frac{1}{1.2} D_2$$

Since $\omega_1 = 2\omega_2$, the shearing ratio in the outermost fluid layer will be:

$$\left(\frac{du}{dy}\right)_2 < \frac{1.2}{1} \left(\frac{du}{dy}\right)_1$$

From the above formula, the slip speed will become 40 percent or less in the above embodiment provided with the intermediate rotor, than that encountered with the conventional arrangement. This means that according to the present invention, the critical limit of the slip speed at the driven side can be increased 40 percent or more than in the conventional arrangement. The above-mentioned embodiment can be called of the double layer fluid system wherein the slip rate per each layer is considerably reduced in comparison with the conventional arrangement which can be referred to the single layer fluid system. Therefore, disadvantageous turbulent flow can be prevented from being generated over normally encountered speed range of the driving engine. In this case, otherwise encountered negative value of the increase rate of the transmitted torque may be positively assured, as determined by our practical experiments. The main performance gain is shown in FIG. 3 by a crosshatched area M.

Within the scope of the invention, the intermediate rotor is not limited to one.

In a modified arrangement, there are provided two intermediate rotors 100 and 101 which are freely mounted by bearing means 102 and 103, respectively, on the main or drive shaft 99 which is similar to that shown at 10 in the foregoing embodiment. The casing is shown at 104 which is also mounted rotatably on the drive shaft 99 which carries rigidly the first rotor 105 for unitary rotation therewith. The first rotor 105 is adapted for coupling with the second rotor 100 by the provision labyrinth tongue-and-groove fluid coupling means generally shown at 106.

Second rotor 100 and third rotor 101 are coupled with each other by the provision of a small fluid ring gap at 107. In the similar way, third rotor 101 is coupled with the casing 104 which carries thereon fixedly a plurality of fan blades although not shown, by the provision of a similar small fluid ring gap at 108.

In the second embodiment shown in FIGS. 3 and 3A, drive shaft 10', flange 10a', bolt hole 11', casing 12', bearing 13', first rotor 17', sealing means 22', cooling fans 23' and fan blades 25' are similar to those denoted respective similar reference numerals without prime in the foregoing embodiment.

Closure cover 16' is also provided for the closure of the interior space of said casing 12', yet in the present embodiment through the intermediary of a pumping plate 30 formed with two or more of conventional pumping projections 31 only one of which is shown in FIGS. 3, 3A and 3B, respectively.

Within the interior of the casing 12', there is formed thus a fluid chamber 15' closed at its one end by said pumping plate 30. In addition, there is formed a fluid reservoir chamber 32 which is defined by said closure plate 16' and pumping plate 31 which is formed with a plurality of communication holes 33, thereby a fluid communication being established between said chambers 15' and 32.

In close to the pumping plate 30, yet separated therefrom by a small clearance, there is provided a first rotor 17' fixedly mounted on the end of the drive shaft 10'.

The pumping disc or plate 30 is formed with a plurality of valve openings 31 which are normally closed by a resilient spider 35 which is fixedly mounted on a central piece 36 mounted slidably in its axial direction through the center of the cover plate 16'. For establishing a slidable, yet sealed connection between the piece 36 and the spider 35, there is provided a sealing ring 37. Numeral 38 represents a bimetal coiled strip one end of which is fixedly attached to said piece 36, while the opposite end is attached to said spider 35.

Therefore, when the ambient temperature is increased to or beyond a certain predetermined value such as 60°C., for instance, in the case of automotive use, the bimetal coil 38 is energized so as to turn the spider acting as the valve means for the openings 34 which are opened to a larger or lesser degree.

Second rotor 39 is rotatably mounted on the drive shaft 10' by means of needle bearing 40. Communication openings 41 and 42 are bored through the rotor walls 17' and 39, respectively, for conveying the viscous fluid to and from the part of fluid chamber 15' which is defined between second rotor 39 and the rotatable casing 12' which acts as a third rotor in the present embodiment.

For establishing a successful fluid coupling a labyrinth or tongue-and-groove connection, generally shown at 43, having a similar design as referred to in the foregoing embodiment with reference to parts 17a, 17b, 18a and 18b. Each of the labyrinth gaps may be 0.3—0.5 mm. The rotor diameter generally amounts to 100—140 mm. when used for the automotive purpose.

Between the second and the third rotor, there is also provided a similar labyrinth fluid connection, generally shown at 44.

For effectively establishing the required fluid coupling between the rotor R and the rotatable casing H in the conventional machine, the rotor width a shown in FIG. 4 as measured in the axial direction amounted generally to 7—25 mm. for automotive use. In the present embodiment, the width b of the first rotor 17' amounts to a highly reduced value, generally from about 3 mm. to a negligible small value such as 0.5 mm. which means practically nil when seen from the machining procedure.

In operation, torque is transmitted from the driving engine to the drive shaft 10', and thus to the first rotor 17' so as to rotate the latter. Under resting conditions of the fluid coupling before rotation of the first rotor, the oil level occupies that shown L–L' which may be applied equally to the case of the first embodiment. In practice, therefore, the fluid chamber 15 or 15' is filled only partially.

Rotation is therefore transmitted from the first rotor to the second rotor 39 by the coupling action of the viscous fluid caught by the coupling labyrinth 43. By the coupling action of the fluid existing in the cylindrical gap formed between the outside periphery of the second rotor and the inner wall surface of the casing 12', the latter is also brought into rotation.

When the ambient temperature is relatively low, generally below 60°C., and the bimetal strip 38 is not actuated, the valve openings 34 are kept closed by the valving spider 35 (which means that the fluid coupling in its partially coupled condition), substantial part of the fluid is pumped by the pumping projections 31 and forced from the fluid chamber 15' through the communication openings 33 into the reservoir chamber 32 wherein therefore a liquid level P–P' will be generally maintained. On the other hand, a liquid level Q–Q' will be maintained within the liquid chamber 15'.

Since torque transmission from the first rotor to the second rotor is carried into effect by the part of the fluid which wets only a part of the opposing wall surfaces of the related both rotors, the practically transmitted torque is relatively small in its amount. The same principle is applied to the transmission from the second rotor to the third rotor which is the rotatable casing 12'. In the conventional machine, the low torque curve will be such that as shown at E in FIG. 5, while in the present invention the curve will further flattened as shown at G in FIG. 6.

When the ambient temperature exceeds a predetermined value such as 60°C., the bimetal strip 38 is actuated thermally so as to rotate the spider in one or another direction so that the valve openings 34 are at least partially opened, as was briefly described hereinbelow. Therefore, the fluid is conveyed from the reservoir chamber 32 through openings 34, 41 and 42 in the successive order, thereby the oil level I–I' within the fluid chamber 15' as specifically shown in FIG. 3A, which function is however conventional and the corresponding oil level is shown at J–J' in FIG. 4. In practice, the liquid surface I–I' and J–J' are somewhat inclined as shown under the the influence of the centrifugal force.

Therefore, torque transmission in this case is carried out from the first to second rotor by a considerably increased quantity of the liquid wetting the correspondingly increased opposing surfaces of the both rotors, being including the labyrinth 43.

In the similar way, a larger quantity of the oil contained in the liquid chamber 15' will be invited to perform the torque transmission from the second to the third rotor, by making the labyrinth join with the transmission.

Prevention of overheating of the coupling fluid and improvement in the high torque performance curve will be substantially same as before, as will be well understood from the comparison of the conventional performance curve at D shown in FIG. 5 with that denoted F in FIG. 6.

By reducing the rotor width from $a$ to $b$ as in the present embodiment, the fluid coupling effect directly between the first and the third rotor can be substantially prevented from taking place. Therefore, the low torque characteristic curve is further improved.

It will be seen from the foregoing the fluid will circulate between the chambers 15' and 32 through openings 33, 34, 41 and 42 under the aforementioned higher temperature conditions.

Although only two exemplary embodiments of the invention have been disclosed herein for purposes of illustration, it will be understood that various changes, modifications and substitutions may be incorporated in such embodiments without departing from the spirit of the invention as defined by the claims which follow.

We claim:

1. A viscous fluid coupling comprising, a drive shaft, a first rotor fixedly mounted thereon, a casing rotatably mounted on said drive shaft for acting as a second rotor, an intermediate rotor rotatably mounted on said drive shaft, a closing cover member fixedly attached to the casing in its extremity, a closed chamber constituted within the interior of said casing and said closing cover member, said chamber filled partially with viscous fluid and housing said first and intermediate rotors, said intermediate rotor being provided to mediate the torque transmission between said first and second rotors through the medium of said viscous fluid.

2. A fluid coupling as set forth in claim 1, wherein said first and intermediate rotors have radially outwardly fluid communication perforations formed axially thereof, said perforations of the first rotor being projected into the respective grooves formed by the perforations in the intermediate rotors and spaced from the perforations of the intermediate rotor by small gaps.

3. A fluid coupling as set forth in claim 2, further comprising additional fluid communication perforations formed axially through said intermediate and second rotor.

4. A fluid coupling as set forth in 1, further comprising, a valve member rotatably mounted on said closing cover member, a temperature responsive device fixedly attached to said cover member at one end thereof and to said valve member at the other end thereof, a pumping plate with at least one inlet port and outlet port fixed to said second rotor to separate said chamber into two elements, a working chamber element and a reservoir chamber element, at least said inlet port being adjacent said valve member.

5. A fluid coupling as set forth in claim 4 wherein the axial width of the outer periphery of said first rotor is considerably reduced relative to that of said intermediate rotor.

6. A fluid coupling as set forth in claim 4 wherein the pumping operation of the viscous fluid from said working chamber element to said reservoir chamber element is achieved through the relative rotation of said first rotor and said pumping plate.